(No Model.)

D. J. DAVIS.
CENTRIFUGAL CREAM SEPARATOR.

No. 574,884. Patented Jan. 12, 1897.

WITNESSES
J. B. Donalson
Hermann Heinze

INVENTOR
D. J. Davis,
BY L. B. Coupland & Co.
ATT'YS.

UNITED STATES PATENT OFFICE.

DANIEL J. DAVIS, OF CHICAGO, ILLINOIS.

CENTRIFUGAL CREAM-SEPARATOR.

SPECIFICATION forming part of Letters Patent No. 574,884, dated January 12, 1897.

Application filed August 21, 1895. Serial No. 559,983. (No model.)

*To all whom it may concern:*

Be it known that I, DANIEL J. DAVIS, a citizen of the United States, residing at Chicago, in the county of Cook and State of Illinois, have invented certain new and useful Improvements in Centrifugal Cream-Separators; and I do hereby declare the following to be a full, clear, and exact description of the invention, such as will enable others skilled in the art to which it appertains to make and use the same.

This invention relates more especially to improvements in that class of devices used in the process of mechanically creaming milk by centrifugal action.

Practical working has demonstrated the fact that great care and skill must be exercised in constructing and putting the different parts together, so that the true balance of the separator vessel or drum may be uniformly maintained.

The high rate of speed at which this class of machines is run makes it an absolute requirement that the detachable parts may be readily removed and replaced without throwing the separator vessel or bowl out of balance in the least.

The object, therefore, of this invention is to secure the diaphragm or dome dividing the milk and cream walls in the process of separation that the same may be quickly and conveniently removed and replaced without the least possibility of affecting the accurate balance of the revolving cylindrical vessel or bowl.

Figure 1:
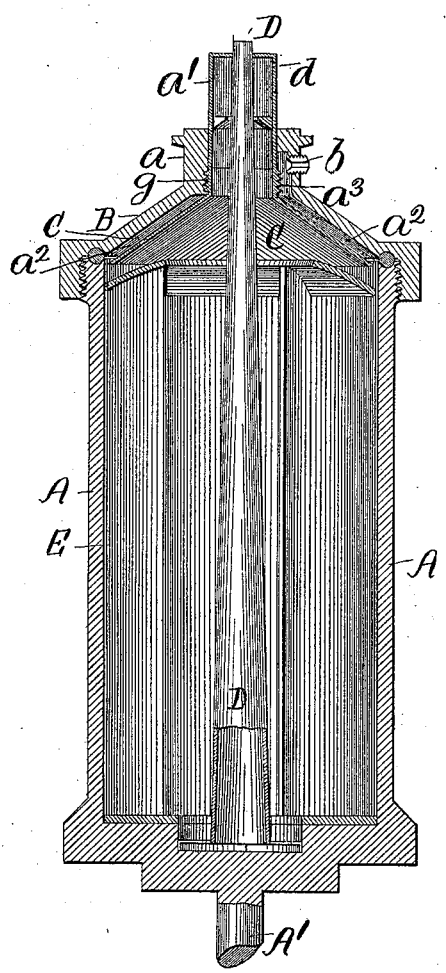
Figure 2:
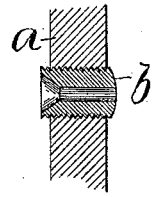

In the drawings, Figure 1 is a vertical longitudinal section of a separator vessel and interior parts, and Fig. 2 a broken-away sectional detail.

A is a separator vessel or bowl, preferably of the cylindrical form shown, and A' the usual driving-spindle, shown broken away.

A conical cap B closes the upper end of the creaming vessel. This cap has sloping sides upwardly and terminates in a contracted top part $a$, having a vertical wall. A detachable conical diaphragm C is located on the inside of the vessel and is of such a shape as to conform to the contour of the sloping sides of cap B up to the contracted top part $a$. From this point upwardly the diaphragm is provided with a neck extension $a'$, having straight sides and fitting closely within the corresponding sides of cap B. This diaphragm divides the outgoing volumes of milk and cream, the sloping or inclosed sides being of a less diameter than that of the correspondingly-decreasing diameter of the inclosing cap, and provides an annular space $a^2$ for the upward flow of the outgoing volume of creamed milk into a passage $a^3$ and out through a tubular plug $b$. The volume of cream as it is separated from the milk flows upwardly on the inside of the diaphragm into the throat-passage in the neck extension and escapes therefrom through an outlet $d$. This neck extension has a screw-threaded engagement with the inclosing walls of the cap, as at $g$, below the milk-outlet. From the point of its threaded engagement upwardly the exterior surface of the neck is close-fitting in the inclosing wall, as shown.

In Patent No. 521,104, dated June 5, 1894, the neck extension is threaded to the cap close to the top, thus rather supporting the diaphragm in a suspended position.

In the present arrangement the threaded connection is at the junction of the diaphragm and its neck extension and at the base of the contracted top part of the cap B, thus more rigidly supporting the diaphragm from a central point below the milk and cream outlets. By this arrangement the diaphragm is much less liable to be sprung or twisted out of shape in removing or replacing the same and therefore lessening the chances of getting the vessel out of balance.

The full milk is received into the vessel through the tube D, which opens at the bottom.

E is the usual wing attachment for imparting the required motion to the liquid.

Having thus described my invention, what I claim as new, and desire to secure by Letters Patent, is—

In centrifugal cream-separators, the combination with a rotatable vessel or bowl, provided with a conical closing-cap terminating in a contracted top part having a milk-outlet therefrom, of a diaphragm, corresponding in contour to the sloping sides of said cap but of a less diameter, and terminating in a neck extension having a cream-outlet and provided with a threaded connection in said contracted top part below the milk-outlet, substantially as described.

In testimony whereof I affix my signature in presence of two witnesses.

DANIEL J. DAVIS.

Witnesses:
L. M. FREEMAN,
L. B. COUPLAND.